Patented Oct. 11, 1938

2,132,449

UNITED STATES PATENT OFFICE 2,132,449

CRYSTALLINE FERRIC SULPHATE AND METHOD OF PREPARING THE SAME

John F. White, Somerville, Mass., assignor, by mesne assignments, to Monsanto Chemical Company, a corporation of Delaware No Drawing. Application May 16, 1934, Serial No. 725,904

4 Claims. (Cl. 23—126)

This invention relates to the preparation of sulphates of iron and it has particular relation to the preparation of such sulphates in the ferric state.

The main objects of the invention are to provide solid crystalline ferric sulphate compounds which are quickly and completely soluble in water; to provide solid crystalline ferric sulphate compounds which readily dissolve in water without the production of appreciable amount of insoluble residues; the provision of highly soluble ferric sulphate compounds which contain a relatively small amount of water and this being in the form of water of crystallization; to provide solid ferric sulphate compounds which are especially suitable for use as precipitating agents in the sizing of paper and for similar purposes; and to provide a simple and economical method of preparing materials of the above indicated type. These and other objects will be apparent from perusal of the following specifications.

Ferric sulphate has heretofore been proposed as a coagulant suitable for the purification of water and sewage, and as an astringent for use in the sizing of paper. Sulphates suitable for these purposes were conveniently prepared by various methods. For example, one method involved oxidation of ferrous sulphate to the ferric state by means of acid. However, another, and in many cases more economical method, involved the treatment of ferric oxides such as iron ores or the oxide obtained in the roasting of pyrite with sulphuric acid. The sulphates were obtained initially as aqueous solutions which were then evaporated to dryness, to form a product which could be handled and transported economically. A relatively large number of these ferric sulphate salts were known to exist and these were distinguished from one another by variation in the relative proportions of sulphate radical and iron oxide, the amount of water of crystallization present, and the relative solubility in water. The following constitute some of the sulphates which have been identified in the liquors or in the final product under various conditions of operation:

$Fe_2O_3 4SO_3 9H_2O$
$Fe_2O_3 4SO_3 3H_2O$
$Fe_2O_3 3SO_3$
$Fe_2O_3 3SO_3 6H_2O$
$Fe_2O_3 3SO_3 7H_2O$
$Fe_2O_3 2SO_3 H_2O$
$Fe_2O_3 2SO_3 5H_2O$
$2Fe_2O_3 5SO_3 17H_2O$

The compound containing iron oxide and sulphate radicals in the ratio expressed by the formula $Fe_2O_3.3SO_3$ was termed normal or neutral sulphate. The ones containing a higher ratio of $SO_3$ such as $(Fe_2O_3 4SO_3)$ were termed acid sulphates and the ones containing a higher ratio of ferric oxide were termed basic sulphates. Some of these compounds are relatively insoluble and it has for this reason been difficult to obtain a commercial product of a satisfactory degree of solubility.

Solutions of ferric sulphate prepared in the ordinary manner by the reaction of sulphuric acid upon burnt pyrite or a ferric oxide consist of relatively complex mixtures of a plurality of these salts. In order to admit of the convenient handling of the salt it is desirable to reduce them to the solid form containing as small a proportion of water as can economically be obtained. However, this conversion of the solution has not heretofore been satisfactorily obtained for various reasons. For example, the solutions after they have been boiled down to a relatively low water content tend to become so viscous that heat transfer to the solutions becomes practically impossible and the material can only be obtained as a viscous solution which is extremely difficult to handle.

This invention involves the discovery of a convenient method of transforming viscous solutions of normal ferric sulphate, containing small amounts of either the acid or the basic ferric sulphate salts in solution, into the form of a solid apparently of crystalline structure which is quickly and substantially completely soluble in water even in the cold state.

This conversion of the ferric sulphate in solution into its crystalline or solid form may be effected by boiling the ferric sulphate solutions obtained, for example, from the reaction of sulphuric acid with iron pyrite cinder down to as concentrated a state as possible, then cooling the liquors fairly slowly and permitting them to crystallize while they are undisturbed over a period of several hours and while they are seeded with ferric sulphate crystals of approximately the same composition as those obtained in the process.

The process is applicable to the manufacture of normal ferric sulphate containing small amounts of either the acid or the basic sulphates and any suitable sulphate liquor may be employed as the primary material, for example, the ferric sulphate liquor obtained by the oxidation of a solution of ferrous sulphate by means of nitric acid already mentioned may be employed. However, a liquor which has been found to be highly satisfactory and economical may be obtained by reacting a ferric oxide such as iron ore or the cinder of iron pyrite with sulphuric acid. A convenient method of forming such solutions of ferric sulphates is disclosed in my copending joint application, Patent Number 2,045,625, issued June 30, 1936.

According to this process the ferric oxide or pyrite cinder in 20% or 25% excess of that theoretically required is treated with sulphuric acid of approximately 35°–40° Bé. If acid of lower concentration than this is employed, the time of reaction is increased to an unreasonable degree and if acid of materially higher concentration is employed, acid salts may be precipitated. During the reaction there is considerable evaporation of water so that the ratio of total $SO_3$ to water tends to rise and care should be taken to prevent it from becoming higher than that represented by acid of about 40° Bé (taken at boiling point) during initial stages of the reaction else acid salts just mentioned will tend to crystalline out or precipitate. This precipitation if unchecked may proceed so far that the entire mass sets up. Such tendency may be corrected, if it occurs, by the addition of a suitable amount of water whenever acid salts begin to separate. After approximately 27% to 50% of the acid has combined with iron oxide, this tendency of the acid salts to precipitate ceases and it is found that only neutral salts will separate. It then becomes quite possible to concentrate the solution by boiling at normal pressure or under reduced pressures without the formation of the undesirable components and usually the solution is concentrated to a strength greater than 60° Bé (taken at the boiling point) before being subjected to subsequent treatment.

Preferably a considerable excess of cinder, for example a 20% or 25% excess, is introduced for purposes of speeding up the reaction and effecting more nearly complete removal of the sulphuric acid within a reasonable period, and this excess, together with silicate or other insoluble material are removed at completion of the reaction at a temperature of about 90° C. and at a concentration of 55° Bé by decantation or filtration. Concentration of the solution may be conducted at or near normal boiling temperatures, provided conditions are so regulated as to prevent separation of crystals in the liquor and provided the temperature is not maintained for too long a period of time. Generally, approximately six or seven hours is permissible.

For purpose of forming an acid material from such solution preliminary treatment before converting the liquor into the solid state is not required. However, the solution of liquor in its initial state will contain some ferrous sulphate and usually this should be kept relatively low (not more than 3 or 4 per cent of the total iron). The amount of iron in ferrous state may be reduced by oxidizing with nitric acid, and by suitable regulation of the amount of ferrous iron present the amount of free sulphuric acid is likewise reduced. It is possible to obtain any desired reduction of the amount of ferrous iron, even to the extent of entirely eliminating it or as will presently be explained, in connection with the preparation of a normal sulphate containing some basic sulphate, of converting it into the basic state. Conversion of the liquor into the crystalline form may be accomplished by the following treatment. It is necessary to continue to concentrate the liquor so far as possible by heating to a boiling temperature. In this way the solution may be concentrated to 60° Bé or more. This concentration should be accomplished in as short a time as is practical as any unreasonable delay may cause the separation of insoluble basic compounds. Usually 7 to 8 hours is permissible, although under special conditions it is probable that this may be extended. The concentrated material is then allowed to cool down relatively slowly by pouring it upon a table or into a shallow container which is of sufficient size and depth to prevent the temperature dropping down to the atmospheric range until the lapse of about 3 hours. Seeding of the material is effected by pouring the liquor at the beginning of the cooling stage upon some crystals which are present in the cooling vessel. After the material has been cooled it is allowed to stand undisturbed for a period of 12 to 16 hours, at the end of which time the entire mass will be found to have been transformed into a mass of relatively porous crystals of several times the volume of the original fluid and no liquor will be retained in a visible, free state.

The crystals are so porous and friable that they may be scooped, shoveled or swept from the crystallization vessels with almost no force. They dissolve substantially completely in water and within a relatively short period of time. For this reason they are especially suitable for the precipitation of rosin in the sizing of paper. However, they are also equally suitable for numerous other purposes such as the clarification of water and sewage. These sulphates contain approximately from 70% solid material to 75% or more, depending on time of exposure to air after crystallization. The solids consist principally of the normal sulphate ($Fe_2O_3 3SO_3$) but in addition to this there are also present some of the acid salts and these usually constitute about 5% or 6% of the total sulphate material. However, this quantity is somewhat variable depending upon the condition of the reaction.

The preparation of the normal salts containing some basic sulphate is effected in a similar manner to the acid material. However, the basic component is produced in the primary sulphate liquors by subjecting the liquor, which preferably should contain some ferrous sulphate, to oxidation by means of nitric acid or some similar oxidizing agent. This oxidation results in the transformation of the ferrous sulphate into basic ferric salts, providing the ratio of free acid to ferrous sulphate is such that there is insufficient acid for the iron in the higher valence. The normal sulphate containing same basic sulphate is substantially completely soluble in water which is quite contrary to what would be expected because basic ferric sulphates have heretofore been regarded as highly insoluble materials.

Concentrated ferric sulphate solutions prepared in accordance with the method already described, if stirred during the period of solidification and if seed crystals have been added thereto will crystallize, and agitation or mixing will accelerate the crystallization but the product obtained in this maner is a solid one of moist crystals which are very difficult to handle.

Suitable seed crystals may be prepared initially by subjecting a solution (concentrated) of the ferric sulphate to repeated periods of alternate heating and cooling. Of course, after crystals have once been obtained this method of preparing the seed crystals is no longer required because crystals from one batch can be used to seed the next.

Although I have shown and described only the preferred forms of the invention, it is to be understood that the invention is not limited to these specific embodiments of the invention but that various modifications may be made therein without departure from the spirit of the invention or the scope of the appended claims.

What I claim is:

1. The method of producing dry porous readily and substantially completely soluble ferric sulphate which is essentially the normal ferric sulphate characterized in that a solution of ferric sulphate corresponding substantially in combined $Fe_2O_3$ and $SO_3$ content to the normal ferric sulphate, is evaporated sufficiently rapidly to avoid formation of insoluble by-products to a concentration of approximately 60° Baumé (taken at the boiling temperature), cooling the product in the presence of an added seeding agent composed of normal ferric sulphate crystals while allowing it to expand several times in volume and form a resulting product which is essentially free of liquid phase.

2. The method of producing dry porous readily and substantially completely soluble ferric sulphate which is essentially the normal ferric sulphate characterized in that a solution of ferric sulphate corresponding substantially in combined $Fe_2O_3$ and $SO_3$ content to the normal ferric sulphate, is evaporated sufficiently rapidly to avoid formation of insoluble by-products to a concentration such that substantially no liquid phase remains after the solidifying step and cooling the product in the presence of an added seeding agent composed of normal ferric sulphate crystals while allowing it to expand several times in volume and form a resulting product which is essentially free of a liquid phase.

3. As a new product a dry, friable, porous, normal ferric sulphate containing only minor amounts of acid ferric sulphate and containing approximately 25% combined water, the product being substantially completely and quickly soluble in cold water, said new product being obtained by first providing a hot concentrated solution of ferric sulphate of a concentration of approximately 60° Baumé (taken at the boiling temperature) and corresponding substantially in combined $Fe_2O_3$ and $SO_3$ content to the normal ferric sulphate, cooling the product in the presence of an added seeding agent composed of normal ferric sulphate crystals while allowing it to expand several times in volume, thus forming a resulting product which is essentially free of liquid phase.

4. The method of producing dry, porous, readily and substantially completely soluble ferric sulphate which is essentially the normal ferric sulphate characterized in that an aqueous solution of ferric sulphate corresponding substantially in combined $Fe_2O_3$ and $SO_3$ content to the normal ferric sulphate, which is of a concentration of approximately 60° Baumé (taken at the boiling temperature), is cooled in the presence of an added seeding agent composed of hydrated normal ferric sulphate crystals while allowing it to expand several times in volume and form a resulting product which is essentially free of liquid phase, and composed substantially of crystals of hydrated normal ferric sulphate.

JOHN F. WHITE.

CERTIFICATE OF CORRECTION.

Patent No. 2,132,449.                                           October 11, 1938.

JOHN F. WHITE.

It is hereby certified that error appears in the printed specification of the above numbered patent requiring correction as follows: Page 2, first column, line 24-25, for the word "crystalline" read crystallize; and second column, line 58, for "same" read some; and that the said Letters Patent should be read with this correction therein that the same may conform to the record of the case in the Patent Office.

Signed and sealed this 20th day of December, A. D. 1938.

Henry Van Arsdale

(Seal)                                                   Acting Commissioner of Patents.